United States Patent [19]

Frizot

[11] Patent Number: 5,069,862
[45] Date of Patent: Dec. 3, 1991

[54] APPARATUS FOR HANDLING A MACHINE FOR THE TENSIONING OF SCREWED CONNECTING ELEMENTS

[75] Inventor: Alain Frizot, Montcenis, France
[73] Assignee: Framatome, Courbevoie, France
[21] Appl. No.: 414,159
[22] Filed: Sep. 27, 1989
[30] Foreign Application Priority Data

Sep. 27, 1988 [FR] France .................. 88 12603

[51] Int. Cl.$^5$ ............................................ G21C 19/00
[52] U.S. Cl. ................................. 376/260; 81/57.38; 29/240
[58] Field of Search .............. 376/260, 263, 249, 463; 29/240, 560, 711, 723; 81/57.38; 220/327

[56] References Cited

U.S. PATENT DOCUMENTS

| | | | |
|---|---|---|---|
| 3,851,906 | 12/1974 | Frisch et al. | 376/263 |
| 4,120,218 | 10/1978 | Togel et al. | 81/57.38 |
| 4,233,727 | 11/1980 | Kautetzky et al. | 81/57.38 |
| 4,304,156 | 12/1981 | Boudet et al. | 81/57.38 |
| 4,581,956 | 4/1986 | Robert | 81/57.38 |
| 4,802,806 | 2/1989 | Sevelinge | 411/383 |

FOREIGN PATENT DOCUMENTS

| | | |
|---|---|---|
| 0242400 | 10/1987 | European Pat. Off. . |
| 2152873 | 4/1973 | France . |
| 2400412 | 3/1979 | France . |
| 0222625 | 5/1987 | France . |

Primary Examiner—Daniel D. Wasil
Attorney, Agent, or Firm—Pollock, Vande Sande & Priddy

[57] ABSTRACT

An apparatus for handling a machine for the simultaneous tensioning of screwed connecting elements (3) such as bolts or pins intended, for example, for the fastening of the cover (1) of a vessel (2). The apparatus comprises a tensioning module (20) for the connecting elements (3), an arrangement (10, 11, 12) for moving the tensioning module (20) in a horizontal plane, and an arrangement (15, 22, 24) for moving the tensioning module (20) along the vertical axis of the connecting elements (3).

8 Claims, 3 Drawing Sheets

APPARATUS FOR HANDLING A MACHINE FOR THE TENSIONING OF SCREWED CONNECTING ELEMENTS

FIELD OF THE INVENTION

The present invention relates to an apparatus for handling a machine for the tensioning of screwed connecting elements, such as bolts or pins.

BACKGROUND OF THE INVENTION

In industrial installations using screwed connecting elements, a pull is exerted on the said elements during clamping and releasing operations by pull is exerted on the said elements by means of a tensioning machine for the purpose of keeping the elements in the prestressed state.

This applies to pressurized vessels, such as vessels of nuclear reactors, where the cover is fastened removably to the vessel, in order to allow periodic refuelling of the nuclear reactor and, via this cover, inspection of the interior of the vessel and the elements located inside it.

For this purpose, the cover is fastened to the vessel of the reactor by means of pins which are screwed into the flange of the vessel and which penetrate into smooth holes made in the flange of the cover. These pins are usually used in somewhat large numbers and are relatively close to one another, with the result that the removal and refitting of the cover requires the unscrewing and screwing of all these pins after the prestressed state obtained by means of the tensioning machine has been relieved.

Tensioning machines composed of a set of hydraulic tensioners fastened and distributed in polar symmetry on a carrier ring are known, for example, from FR-A-2,329,414 and FR-A-2,274,997. The hydraulic tensioners act simultaneously and ensure the desired prestress on each pin.

These machines generally have a bulky infrastructure consisting of a one-piece carrier ring, thus making it impossible to install them when the vessel of the nuclear reactor is located in a relatively restricted environment surrounded by non-removable elements.

SUMMARY OF THE INVENTION

The object of the invention is, therefore, to provide an apparatus for handling a machine for the tensioning of screwed connecting elements, making it possible to do without any environment consisting of non-removable elements and to take action without full participation of the polar bridge of the vessel, thus substantially reducing the cost of this type of action.

According to the invention, the apparatus for handling a machine for the tensioning of screwed connecting elements consisting especially of bolts or pins intended, for example, for the fastening of a cover of a vessel comprises at least one tensioning module for the connecting elements, means for the movement of this tensioning module in a horizontal plane, and means for the movement of the said tensioning module in the vertical axis of the connecting elements.

According to other characteristics of the invention:

means for the horizontal movement of the tensioning module consist of assembled modular elements forming a rolling track, on which travels a train supporting the said tensioning module, the train comprises a driving carriage and a driven carriage, each equipped with a set of guide wheels and connected to one another by means of a strut, and the means for the vertical movement of the tensioning module consist of a vertical endless screw mounted for free rotation on each carriage and of a nut screwed onto each of the endless screws and each connected to the said tensioning module by means of a bracket.

BRIEF DESCRIPTION OF THE DRAWINGS

In order that the invention may be more clearly understood, an embodiment of the apparatus according to the invention will now be described with reference to the accompanying drawings.

DESCRIPTION OF THE PREFERRED EMBODIMENT

Figure 1:
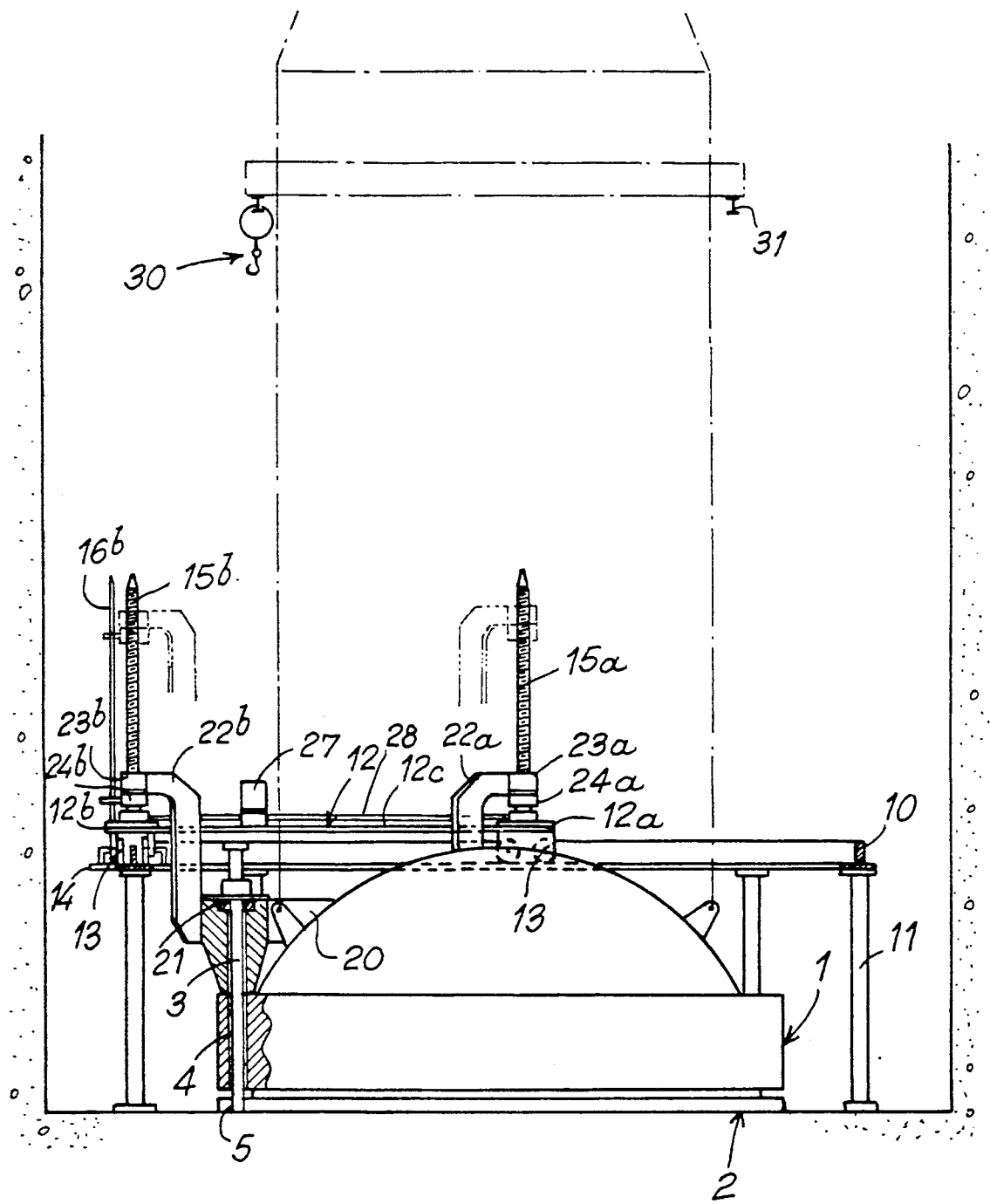
FIG. 1 is a front elevation view of the cover of a nuclear-reactor vessel, near which the apparatus according to the invention is installed.
Figure 2:
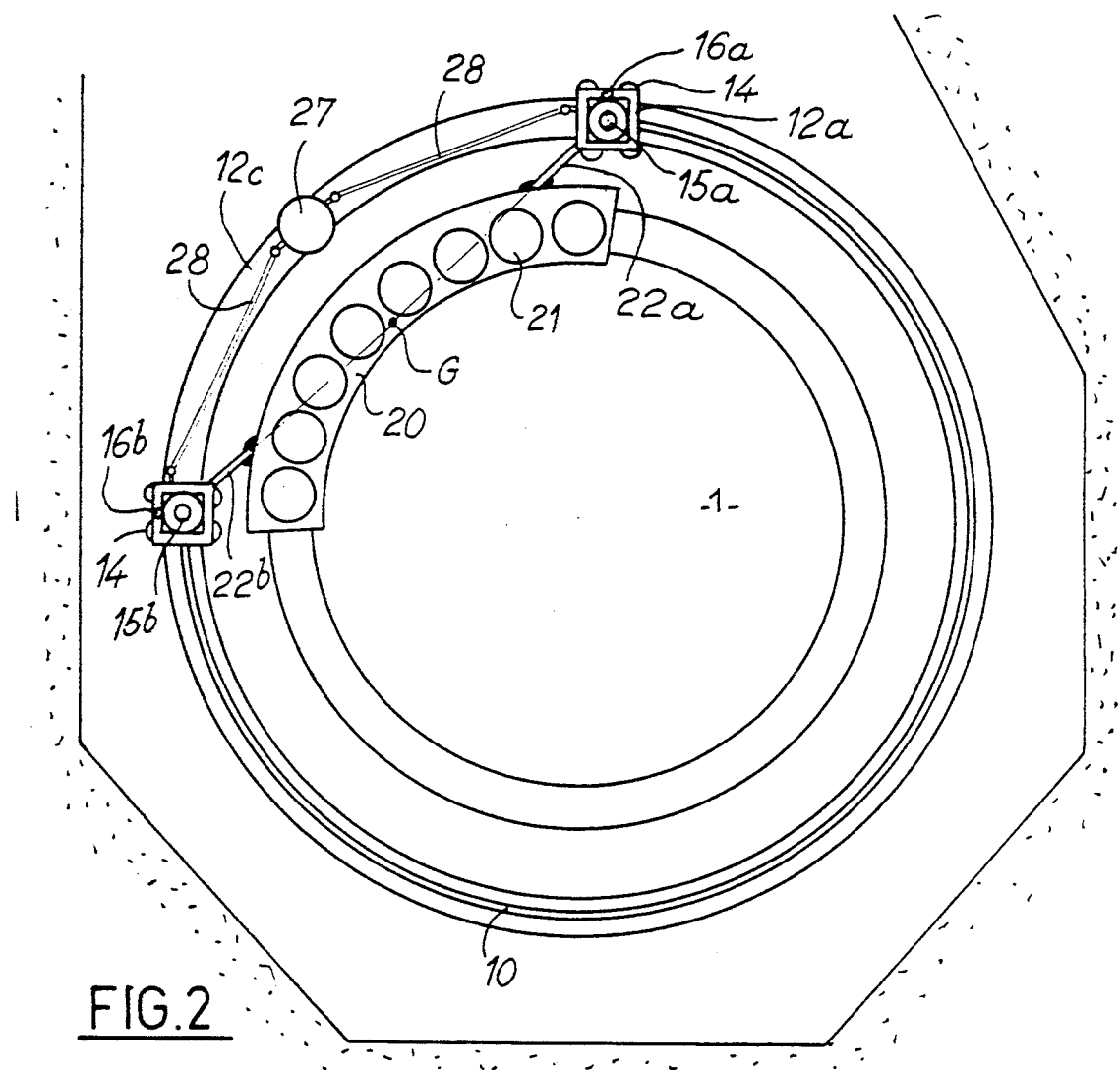
FIG. 2 is a top plan view of FIG. 1.

The apparatus according to the invention, as illustrated in FIGS. 1 and 2, is used for handling a tensioning machine intended for exerting a pull on the pins in order to keep them in the prestressed state, so as to allow the attachment or detachment in this position of the retaining nuts of the cover 1, of a vessel 2 of, for example, a nuclear reactor, which projects slightly above a floor of a building the walls of which limit the space available around the cover.

As is well known, the cover 1 and the vessel 2 have a form of revolution about a vertical geometric axis. The cover 1 is fastened removably to the vessel 2 by means of several pins 3 of vertical axis, together with the associated nuts, the said pins being distributed uniformly on the periphery of the cover 1 of the vessel.

Each pin 3 passes through a smooth vertical hole 4 in the flange of the cover 1 and in its lower part is equipped with a thread intended to be screwed into an internally threaded hole 5 in the flange of the vessel 2. The other end of the pin 3 projects on the outside of the cover 1.

The apparatus has a guide monorail 10 composed, for example, of four assembled sectors, thus making it easier to install it in the space available. The guide monorail 10 is mounted around the cover 1, and each quarter is supported by two columns 11. Once the monorail has been assembled, the columns 11 are distributed at an equal distance from one another.

A train designated as a whole by the reference 12 travels on the monorail 10 and is composed of a driving carriage 12a and of a driven carriage 12b, the said carriages 12a and 12b being connected to one another by means of a semi-circular strut 12c of the same curvature as the monorail 10.

Each carriage 12a, 12b has a set of wheels 13 and 14, some (13) having a horizontal axis allowing longitudinal guidance and the others (14) having a vertical axis allowing lateral guidance.

On the other hand, each carriage 12a and 12b is surmounted, on the one hand, by a vertical endless screw 15a and 15b, respectively, mounted freely in terms of rotation and, on the other hand, by an anti-rotation rod 16a and 16b, respectively which is arranged parallel to the jack screw and the function of which will be explained later.

The train 12 supports a tensioning module 20 which, in the example illustrated in FIGS. 1 and 2, has the form of an arc of a circle concentric with the flange of the cover 1 and comprises eight jack pistons 21 whose arrangement and organization are identical to those of the jack pistons described in applicant's FR-A-2,589,536.

The module 20 is connected symmetrically to the two carriages 12a and 12b by means of two brackets 22a and 22b.

Figure 4:
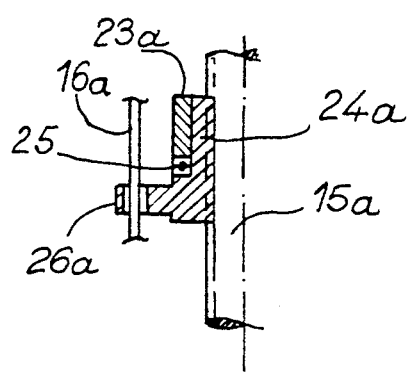
FIG. 4 is a sectional half-view on a larger scale of a nut on the corresponding endless screw.
Figure 3:
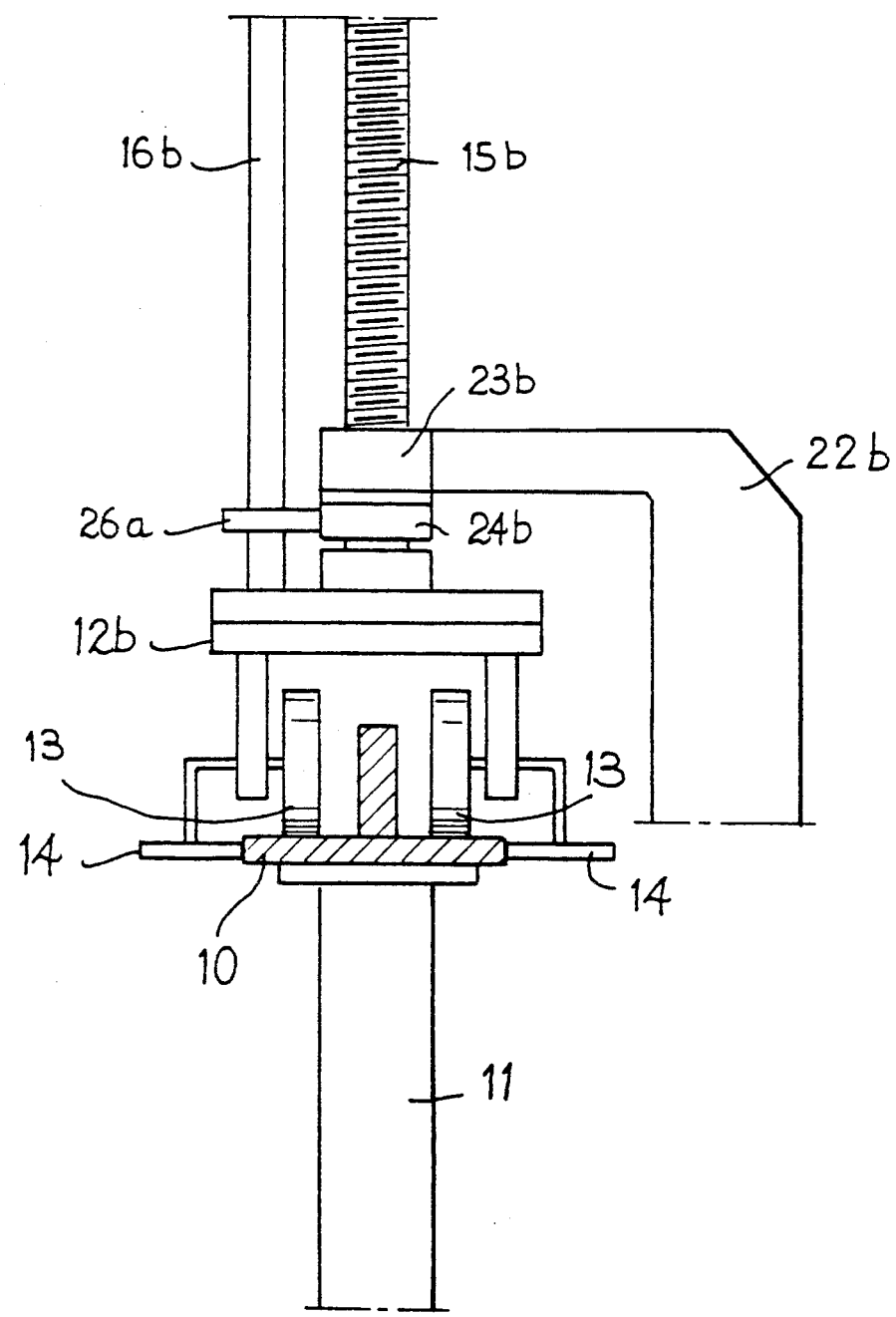
FIG. 3 is an elevation view on a larger scale of a carriage of the apparatus according to the invention.

The bracket 22a is welded to the tensioning module 20 at one of its ends, and the other end has an eye 23a, the bore axis of which is vertical and, on the one hand, centers itself on the cylindrical part of a nut 24a screwed to the endless screw 15a and, on the other hand, comes to bear on the said nut by means of a thrust ballbearinq 25 (FIG. 4).

The nut 24a also has an appendage 26a, in which there is an orifice through which the anti-rotation rod 16a passes.

The same is true of the bracket 22b which is welded at one of its ends to the tensioning module 20 and which at the other end has an eye 23b centered on a nut 24b screwed to the endless screw 15b.

The nut 24b likewise has an appendage 26b through which the anti-rotation rod 16b passes.

The setting in rotation of the two endless screws 15a and 15b is controlled by single motor 27 mounted on the strut 12c half-way between the two carriages 12a and 12b. The motor 27 is connected to each of the endless screws 15a and 15b by means of a control linkage 28 consisting, for example, of a cardan transmission.

The apparatus functions as follows.

First, the various separate elements are put in position by means of a hoist 30 which travels by means of a circular monorail 31 arranged above the cover 1. Once installation is completed and the tensioning module 20 is in the high position, as shown diagrammatically by dot-and-dash lines in FIG. 1, the operator commands the starting of the motor of the driving carriage 12a. Thus, the assembly as a whole travels on the monorail 10 in such a way that the tensioning module takes up position above the first series of pins 3 to be subjected to a pulling force.

Subsequently, the operator commands the starting of the motor 27 which drives the two endless screws 15a and 15b in rotation by means of the control linkages 28. The rotation of these two endless screws 15a and 15b in a particular direction causes the lowering of the tensioning module 20 by means of the nuts 24a and 24b and the brackets 22a and 22b.

The ends of the pins 3 penetrate into the jack pistons 21 of the tensioning module 20, the lower face of which comes to bear on the flange of the cover 1.

As described in FR-A-2,589,536, the jack pistons 21 of the tensioning module 20 exert a pull simultaneously on the series of pins 3, so that the various operations of screwing or unscrewing the retaining nuts of the cover 1 can be carried out.

When these operations have been carried out for the first series of pins, via the motor 27 and the control linkages 28 the operator commands the setting in rotation of the endless screws 15a, 15b in the opposite direction, thus causing the raising of the tensioning module 20.

The jack screws 15a and 15b are placed exactly in the plane of the center of gravity G of the tensioning module 20, so that the vertical movements of this tensioning module are executed without any disruptive lateral force or torsion.

Furthermore, during these vertical movements the rods 16a and 16b prevent any rotation of the nuts 24a and 24b.

As soon as the tensioning module 20 is in the high position, the operator commands the movement of the assembly as a whole in order to carry out the tensioning of the next series of pins, and so on and so forth.

The apparatus can comprise two tensioning machines which travel on the same monorail 10 and which execute the tensioning simultaneously on opposite series of pins.

Furthermore, each tensioning module can be composed at least of a single jack piston and at most of eight jack pistons.

The apparatus according to the invention thus makes it possible for a modular pin-tensioning machine to travel in two directions horizontally about the axis of the bore diameter and alternatively in the vertical axis of the pins on which action is to be taken.

Moreover, this apparatus is composed of an association of elements performing different, but complementary functions, such as those of handling, positioning and tensioning, allowing the zone of action to be approached both from the top and from the side and thus making it possible to do without any environment consisting of non-removable elements.

The apparatus according to the invention is used not only on vessels of nuclear reactors, but in other sectors of the nuclear industry and in petroleum and petrochemical installations. In general terms, the apparatus according to the invention is used in many industrial installations using pressurized vessels.

I claim:

1. Apparatus for handling a machine for the simultaneous tensioning of a plurality vertically disposed screwed connecting elements (3) for fastening a cover (1) of a pressurized vessel (2), said apparatus comprising a tensioning module (20) for said connecting elements (3), means (10, 11, 12) for moving said tensioning module (20) in a horizontal plane, and means (15, 22, 24) for moving said tensioning module (20) along a vertical axis of said connecting elements (3), wherein said means for moving said tensioning module (20) in a horizontal plane comprise assembled modular elements forming a rolling track (10) on which travels a train (12) supporting said tensioning module.

2. Handling apparatus according to claim 1, wherein said train (2) comprises a driving carriage (12a) and a driven carriage (12b), said driving and driven carriages each being equipped with a set of guide wheels (13, 14) and being connected to one another by means of a strut (12c).

3. Handling apparatus according to claim 2, wherein said strut (12c) is semicircular.

4. Handling apparatus according to claim 2, wherein said means for moving said tensioning module along said vertical axis consist of a vertical endless screw (15a, 15b) rotatably mounted on each of said driving carriage (12a) and driven carriage (12a, 12b) and a nut (24a, 24b) screwed onto each of said endless screws (15a, 15b), each of said carriages being connected to said tensioning module by means of a bracket (22a, 22b).

5. Handling apparatus according to claim 4, wherein each said endless screw (15a, 15b) is driven in rotation by means of a single motor (27) mounted on said strut (12c) half-way between said driving and driven carriages (12a, 12b) and connected to each of said endless screws (15a, 15b) by means of a control linkage (28).

6. Handling apparatus according to claim 4, wherein each said bracket (22a, 22b) has a first end fixed to said tensioning module (20) and a second end containing an eye (23a, 23b) centered on a corresponding nut (24a, 24b) and bearing on said corresponding nut by means of a thrust ball-bearing (25).

7. Handling apparatus according to claim 4, wherein each said nut (24a, 24b) has an appendage (26a, 26b) with an orifice through which passes a vertical anti-rotation rod (16a, 16b) arranged on each carriage (12a, 12b) parallel to said endless screws (15a, 15b).

8. Handling apparatus according to claim 4, wherein said endless screws (15a, 15b) are arranged in a plane of a center of gravity of said tensioning module (20).

* * * * *